United States Patent [19]

Eichler

[11] 4,130,378

[45] Dec. 19, 1978

[54] SIDE PROPELLERS FOR THE PROPULSION OF FAST BOATS AND AIRCRAFT

[76] Inventor: Horst Eichler, Auf dem Sande 12, 54-Koblenz-Pfaffendorf, Fed. Rep. of Germany

[21] Appl. No.: 690,275

[22] Filed: May 26, 1976

[30] Foreign Application Priority Data

May 26, 1975 [DE] Fed. Rep. of Germany ....... 2523180

[51] Int. Cl.² ................................................ B63H 1/16
[52] U.S. Cl. ..................................... 416/175; 416/188; 416/236 A; 416/238
[58] Field of Search ............... 416/175, 178, 179, 186, 416/188, 236 A, 238

[56] References Cited

U.S. PATENT DOCUMENTS

| 4,111 | 7/1845 | Hubbell | 416/179 X |
|---|---|---|---|
| Re. 16,370 | 6/1926 | Roberts | 416/238 |
| 33,874 | 12/1861 | Baylis | 416/238 |
| 341,137 | 5/1886 | Forgie | 416/175 |
| 453,361 | 6/1891 | Osborne | 416/238 X |
| 589,946 | 9/1897 | Grunow | 416/186 |
| 1,936,053 | 11/1933 | Ghirardi | 416/179 |
| 2,106,928 | 2/1938 | Lee | 416/188 X |
| 2,426,742 | 9/1947 | Pawlowski | 416/175 |
| 3,092,184 | 6/1963 | Day | 416/175 X |
| 3,609,060 | 9/1971 | Angel | 416/179 |

FOREIGN PATENT DOCUMENTS

| 638173 | 11/1936 | Fed. Rep. of Germany | 416/179 |
|---|---|---|---|
| 411738 | 6/1910 | France | 416/238 |
| 953328 | 12/1949 | France | 416/188 |
| 458809 | 8/1950 | Italy | 416/193 |
| 21314 | 3/1911 | Norway | 416/188 |
| 286849 | 3/1953 | Switzerland | 416/175 |

*Primary Examiner*—Everette A. Powell, Jr.
*Attorney, Agent, or Firm*—Beall & Jeffery

[57] ABSTRACT

A propeller hub rotatable about an axis is provided with a plurality of airfoil surfaces peripherally arranged about the axis and defining a first pitch angle that is acute and adjustable with respect to the tangent on the circular arc described by rotation of the airfoil surface as seen in a plane perpendicular to the axis, and further by a second pitch angle being acute and ajustable and measured with respect to the axis of rotation within a plane containing the axis of rotation. Peripherally adjacent airfoil surfaces may have their first pitch angles oppositely oriented and second pitch angles oppositely oriented to respectively propel fluid inwardly and outwardly with respect to the axis of rotation. The air foil surfaces may be directly connected to the hub and extend conically outward or connected to the hub by means of arms that may be angled airfoil surfaces functioning as conventional screw propellers. The hub may be mounted coaxially adjacent a counter rotating screw.

1 Claim, 15 Drawing Figures

SIDE PROPELLERS FOR THE PROPULSION OF FAST BOATS AND AIRCRAFT

BACKGROUND OF THE INVENTION

The present invention relates to propeller drive systems for bodies traveling through a fluid medium, such as fast boats and aircraft. In particular, the invention relates to propellers having blades mounted substantially parallel to the axis of rotation of the propeller shaft, in contrast to conventional screw-type propellers in which the blades are mounted radially with respect to the propeller shaft axis.

THE PRIOR ART

A variety of methods have been employed in the past for propelling large bodies through a fluid medium, such as resistance propulsion and lift propulsion.

Resistance propulsion, such as that given by bucket wheels, is based upon impulses acting in the direction opposite to the traveling direction of the moving body. Lift propulsion, for example that given by a conventional screw-type propeller, requires movement transverse to the traveling direction of the body, which results in forward thrust lift.

Limited transverse movement, however, such as that of the oscillation of propeller blades, causes at the blade tips a substantial spoiling loss due to deflection of the fluid medium in the region of the blade tip, and for this reason, screw-type propellors are not extremely efficient at high speeds.

Bernoulli published in 1752 an essay on endless transverse movement by rotation. Hydrodynamically, he established the principle that forward thrust energy is produced by the acceleration of water toward the rear. But it was not until 1826 that, with the employment of the steam engine as ship propulsion, the ship propeller as known today was successfully developed.

In modern times, the screw-type propeller has been analogously applied for aircraft propulsion in air, which is 850 times lighter than water. Only at very high speed is the conventional screw-type propeller insufficient for driving ships and airplanes. This is because conventional screw propellers, in comparison with the present invention, present the disadvantage that their efficiency decreases at increased flying speed or traveling speed, because the air or the water medium in the propeller blade area is excessively accelerated or agitated. With their radially pivoted blade shapes, conventional propellers for aircraft and ships fail at the borderline of high speed because they can engage the fluid medium only within the cylinder "jacket" of the medium which circumscribes the area traversed by the blades. Therefore, the medium is agitated to a disproportionate extent and losses occur which reduce the effective propulsion force.

A conventional screw propeller is effective at relatively low traveling speeds of the body through the fluid medium, but begins to lose effectiveness as the body's traveling speed through the fluid medium increases. This is true whether such propellers are mounted in front of, beside, or behind an aircraft fuselage or a ship body.

SUMMARY OF THE INVENTION

It is accordingly an object of the invention to provide a propeller for driving a body through a fluid medium, which overcomes the disadvantages of the prior art.

It is a further object of the invention to provide such a propeller which will accelerate a relatively large air mass radially outward or inward with respect to the propeller shaft, whereby the spoiling losses and noise generation connected with deflection of the fluid medium in a direction transverse to the traveling direction of the moving body remains small.

It is a further object of the invention to provide a propeller blade in which the circumscribed cylinder of medium which is traversed by the propeller increases with an increasing forward speed, whereby the radial acceleration of the engaged medium becomes so small that turbulences resulting in propulsion losses are minimized.

In furtherance of these and other objects of the invention, a side propeller is provided in which blades or end plates are supported substantially tangentially to a cone or cylinder which is coaxial to the propeller shaft axis. The side propeller in one embodiment is constructed so as to support end plates which are set at angles relative to a tangent to the propeller circle as well as to the propeller shaft, the angles being set for maximum efficiency. The end plates are supported from the propeller shaft by radial end plate supports, which are preferably streamlined to act as conventional screw-type propeller blades.

In one embodiment of the invention which utilizes end plates, the end plate supports may be pivoted, much like conventional variable-pitch propellers, in such a way that the pitch angles of the end plate supports are adjusted for optimum efficiency at small forward speeds. The end plate supports may be repositioned for optimum efficiency at high speed.

In an alternative embodiment, side blades are fastened directly to the propeller hub and are predominantly parallel to the axis of rotation of the propeller assembly. Such side blades are set at an angle relative to a tangent to the propeller circle as well as at an angle relative to the propeller shaft axis. The angle relative to the propeller shaft axis may be increased for operation at low speed so that the propeller blades will act as conventional radially positioned propeller blades. At high speed, the blades are repositioned so that they make a smaller angle with respect to the propeller shaft axis.

In one embodiment of the invention utilizing end plates as described above, the plates may be arranged so that successive plates have reverse pitch angles relative to the propeller circle tangent. The successively alternating pitch of the adjacent end plates will produce fluid pressure radially outwardly and radially inwardly at adjacent plates, which would have the effect of balancing the radial mass acceleration of the engaged medium. The alternation of pitch angle may also be present with respect to the shaft axis.

In yet another embodiment of the invention, the end plates set at different angles with respect to one another may be combined to form a closed side ring about the hub.

In a further embodiment of the invention, contra-rotating side propellers may be coaxially mounted or one side propeller may cooperate with a contra-rotating conventional, radial propeller in order to absorb the portion losses of the outflow from the side propeller.

Further details and objects of the invention will become apparent to those skilled in the art in view of the following description of the drawings.

DETAILED DESCRIPTION OF THE PREFERRED EMBODIMENTS

Figure 1:
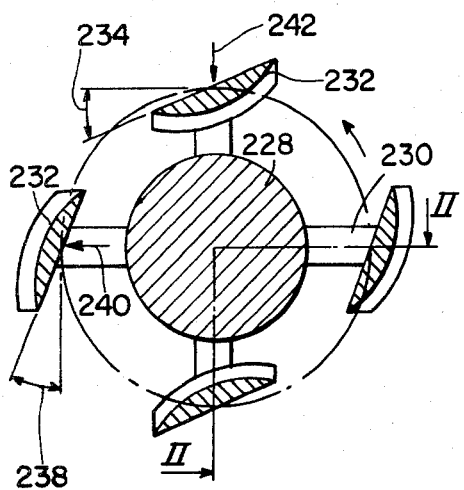
FIG. 1 is a front view of a side propeller according to the present invention with the end plates 4 stern mounted upon a body to be propelled through a fluid medium.
Figure 2:
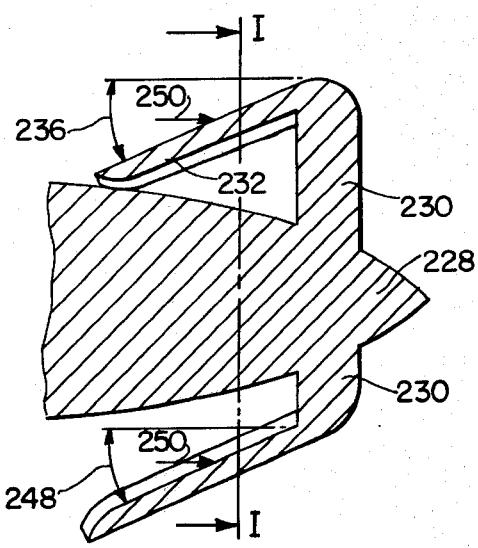
FIG. 2 is a cross sectional view taken along line II—II of FIG. 1 and showing line I-I along which the cross-section of FIG. 1 was taken.

FIGS. 1 and 2 illustrate a side propeller according to the present invention in which shaped arms 230 maintain the propeller blades 232 at a predetermined distance from the aircraft or floating body 228. The profile shape of the shape arms contributes, as in conventional screwtype propellers, to the propeller thrust.

Hub 228 has shaped arms 230 which maintain blades 232 at a pitch angle 234 relative to the tangent on the propeller circle and at pitch angle 236 relative to the propeller shaft axis. While one blade is maintained at angle 234 relative to the tangent on the propeller circle, the adjacent blade is maintained at angle 238, which represents a reverse pitch angle to that of angle 234. Thus, lateral pressure 240 acts on one blade while lateral suction 242 acts on the adjacent blade due to sequential pitch reversal from blade to blade. Correspondingly, pitch angle 236 relative to a parallel to the propeller shaft of one blade is reversed to form angle 248 at an adjacent blade. As a result, the fluid thrust 250 takes place in the rearward direction. The reversal of both pitch angles from one blade to the next results in forward thrust 11 being produced by all blades.

Figure 3:
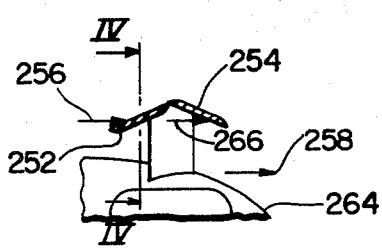
FIG. 3 shows a partial side view of a side propeller according to a different embodiment in which end plates are provided having pitch angles which successively alternate with respect to the side propeller shaft axis.
Figure 4:
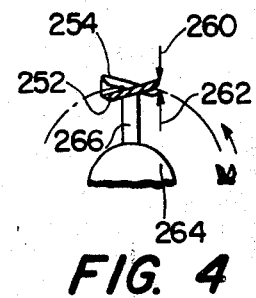
FIG. 4 shows a cross sectional view taken along line IV—IV of the side propeller of FIG. 3.

FIGS. 3 and 4 show a side propeller in which shaped end plates are supported from a hub 264 by end plate supports 266. Each end plate has blade parts 252, 254. Blade part 252 is, in the traveling direction 258, the rear part of the end plate and blade part 254 is the front part of the end plate. In a manner analogous to that described above with respect to FIGS. 1, 2, propeller thrust 256 in the traveling direction is produced, in which process the rear blade part 252 utilizes the outflow of accelerated fluid medium from the front blade 254. As is shown in FIG. 4, the blade parts 252 and 254 produce alternatingly inwardly and outwardly directed lateral forces 260 and 262, in which process the rear blade part 252 utilizes the transversal flow of fluid medium from the front blade part 254.

Figure 5:
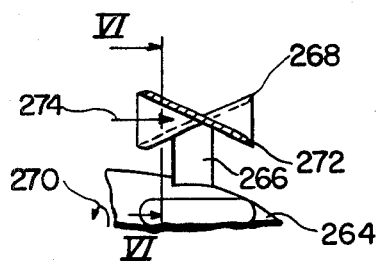
FIG. 5 is a partial side view of a side propeller according to a further embodiment of the present invention in which blade parts have pitch angles successively alternating with respect to the propeller circle tangent.
Figure 6:
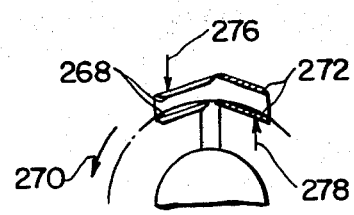
FIG. 6 is a partial cross sectional view taken along line VI—VI of FIG. 5.

In FIGS. 5 and 6 is shown a side propeller with shaped end plates fastened to hub 264 via end plate supports 266. Blade part 268, which is the front portion of the blade when the propeller rotates in the counterclockwise direction 270, and the blade part 272, which is in this case the rear blade part, will produce propeller thrust 274 in the traveling direction. As shown in FIG. 6, blade parts 268 and 272 produce alternatingly inwardly and outwardly directed lateral forces 276 and 278, respectively. It is to be understood in FIGS. 3–6 that the end plate supports 266, as with the shaped arms 230 of FIGS. 1 and 2, may be aerodynamically shaped to aid in forward thrust in the fashion of a conventional screw-type propeller.

Figure 7:
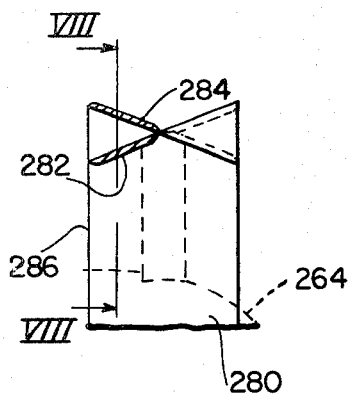
FIG. 7 shows a partial side view of a further embodiment of the present invention in which successive blade parts have alternating reverse pitch angles and are connected together to form substantially a cylinder.
Figure 8:
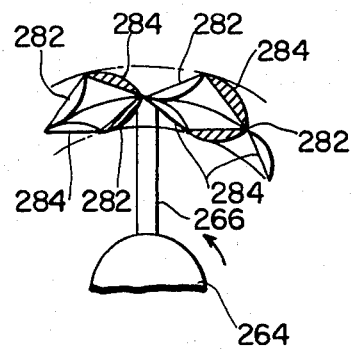
FIG. 8 is a partial cross sectional view taken along line VIII—VIII of FIG. 7.

FIGS. 7 and 8 show a modified form of the side propeller of FIGS. 3–6, wherein the side propeller end plates are extended so that each blade contacts the adjacent blades to form a closed side ring. Blade parts 282 and 284 correspond to parts 252 and 254 of FIGS. 3 and 4 and parts 268 and 272 of FIGS. 5 and 6, and perform the same function of providing forward thrust by having adjacent blades arranged with reverse pitch. The embodiment of FIGS. 7 and 8 has, of course, the advantage of greater rigidity of the blades since each blade is supported by contact with the adjacent blades. In addition, it is possible to utilize a lesser number of end plate supports 266 for maintaining the closed ring 286 coaxially with hub 264, thereby increasing still further the propulsion efficiency in the fluid medium.

Figure 9:
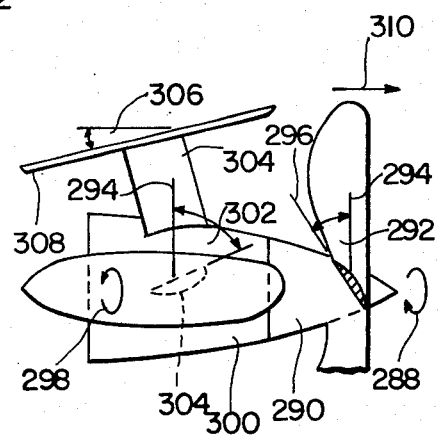
FIG. 9 illustrates the use of a conventional screwtype propeller coaxially aligned with and contra-rotating with respect to a side propeller having end plates.

In FIG. 9 is shown a conventional radial drive screwtype propeller 290 which contra-rotates in front of a side propeller. Due to the relatively small rotational speed of the side propeller, in relation to the conventional propeller, the profile pitch angle 302 of the end plate support 304 is larger than the profile pitch angle 292 of conventional propeller 290. The conventional screw-type propeller 290 rotates in the clockwise direction 288, the effective pitch angle 292 between the propeller plane 294 and the profile longitudinal axis 296 corresponding to the sum of the pitch of a screw in solid work material and the slip due to the elasticity of the fluid medium.

Side propeller 300 rotates in the counterclockwise direction 298, and the effective pitch angle 302 of the shaped arm 304 increases, on the one hand due to the outflow from the screw propeller 290 and on the other hand due to the substantially smaller rotational speed of the side propeller 300. The effective pitch angle 306 of side propeller blade 308 relates to the propeller shaft axis, rather than to the propeller plane 294, as is the case with the conventional screw-type propeller. This is due on the one hand to the smaller speed of rotation of the side propeller with respect to the rotational speed of the conventional propeller, and on the other hand to the small slip transversally to the traveling direction 310. At relatively high flying speeds or traveling speeds through the fluid medium, the effective pitch angle 306 therefore remains very small for the side propeller, while the propulsive force becomes very great.

Figure 10:
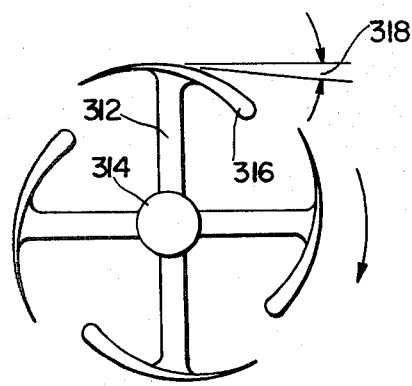
FIG. 10 shows a front view of a side propeller according to a further embodiment of the present invention with end plates for stern mounting upon a body to be propelled through a fluid medium.
Figure 11:
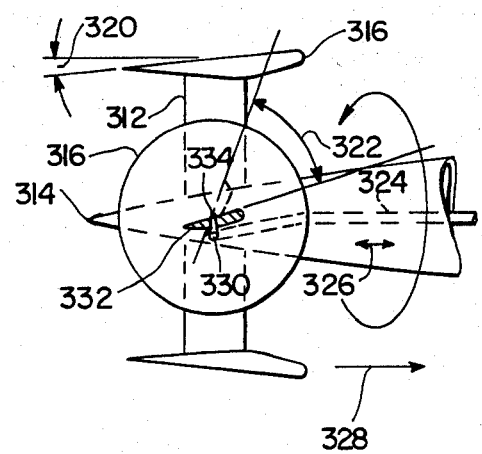
FIG. 11 is a side view of the side propeller according to FIG. 10.

FIGS. 10 and 11 show a side propeller arrangement in which end plate supports 312 are pivotally mounted on propeller hub 314. The end plate supports 312 have a profile shape similar to that of a conventional screw-type propeller so as to support the propulsion provided by end plates 316 mounted on the end plates supports 312. End plates 316 are set at an angle 318 with respect to tangents on the propeller circle and are also set at an angle 320 relative to parallels to the propeller shaft axis. For starting propulsion at low traveling speed, the end plate supports 312 may be pivoted so as to adjust angle 322. An adjusting rod system 324 may be moved fore and aft as shown at 326 in order to modify the amount of propulsive force provided by the side propeller. The adjusting rod 324 is shown pivotally mounted at 330 to crank 332, which is in turn pivotally mounted with end plate support 312 at 334. Although the system shown represents a crude mechanical system for adjusting the effective pitch angle 322, it will be understood by those skilled in the art that any type of conventional variable-pitch adjusting means may be substituted therefore.

The pitch of end plate supports 312 is preferably maintained at an angle which provides optimum efficiency for a given traveling speed of the body to be propelled through the fluid medium in the traveling direction 328.

Conventional screw-type propellers with relatively small effective pitch angles present the very notable disadvantage of large grid losses, due to the fact that the propeller blades which succeed in the rotation will operate very closely behind the preceeding blade. The fluid engaged by the succeeding blade will already be accelerated by the preceeding blade. Thus, the efficiency of a conventional screw-type propeller is not as great as is desirable. Grid losses in side propellers, however, become much less significant because predominantly radially exerted side forces are acting upon the surrounding medium. In addition, side propellers present the advantage that the number of revolutions required to obtain equivalent thrust is reduced by a factor of approximately 7, according to the calculations of the inventor. This reduction in rotational speed of the propeller in order to obtain an equivalent amount of thrust results in much less loss due to lesser acceleration of a large amount of the fluid medium.

Because of the compressibility of the air, very high speed propellers are unsuitable for driving an aircraft which is starting out from a low speed. Therefore, high speed propellers are preferably installed with variable-pitch mechanisms, in order to operate more efficiently. It is as desirable for side propellers as for screw-type propellers to install variable-pitch devices since the cylinder jacket of the fluid medium which is engaged by the propeller is given by $F = \pi.d.v.s$, and depends on the forward speed of the moving body v. When in side propellers with end plates the end plate supports are shaped like conventional radial propeller blades, these end plates supports can aid the forward propulsion as in conventional propellers and can, when pivoted for starting out the body from a low speed by means of conventional pitch-adjusting devices, aid in increasing propeller efficiency as described with respect to FIG. 11.

Figure 12:
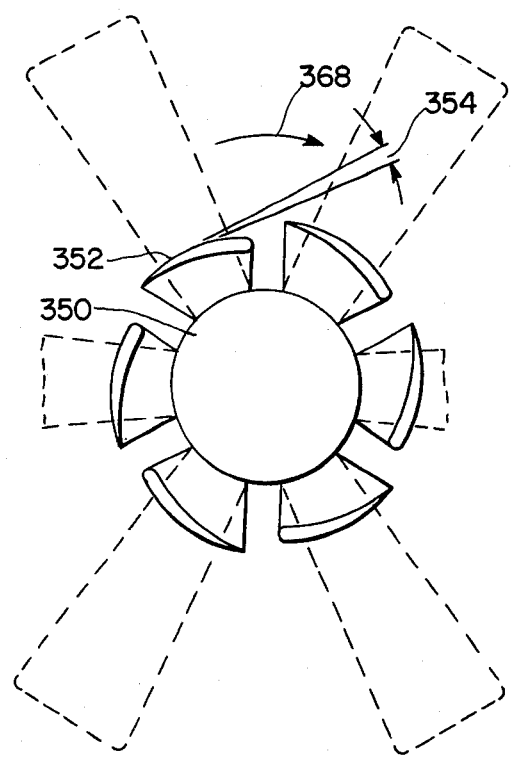
FIG. 12 is a front view of a side propeller according to a further embodiment of the present invention with side blades for mounting upon the bow of a body to be propelled through a fluid medium, according to a further embodiment of the present invention.
Figure 13:
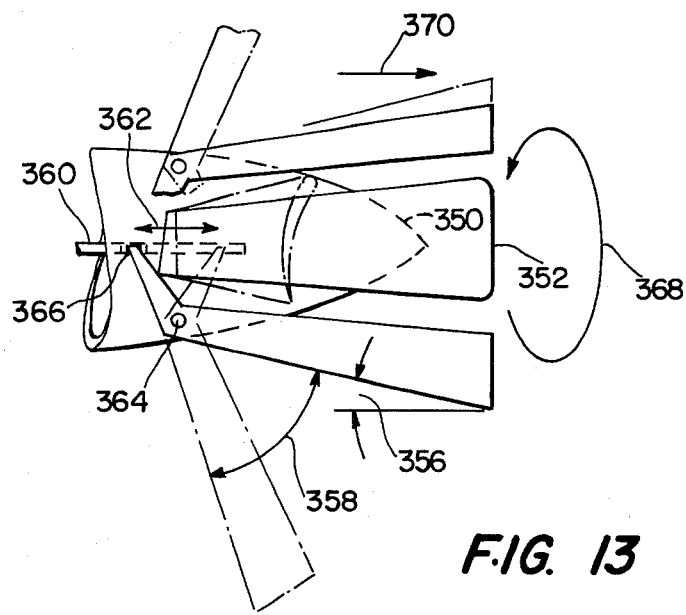
FIG. 13 is a side view of the side propeller shown in FIG. 12.

As shown in FIGS. 12 and 13, a side propeller can be arranged so the blades can be folded inwardly or outwardly with respect to the propeller shaft axis. This permits the blades to act as conventional propeller blades at low traveling speeds, yet also allows efficient operation at high traveling speeds through the fluid medium.

The propeller pitch relative to the propeller shaft axis is variable to provide optimum efficiency at either high or low traveling speeds. Hub 350 has mounted thereon a plurality of side propeller blades 352, each blade being set at pitch angle 354 with respect to a tangent to the propeller circle. The pitch angle of the blades for high speed operation is shown at 356 with respect to parallels to the propeller shaft axis, while the pitch angle 356 may be adjusted by an amount equal to angle 358 in order to allow for efficient lowspeed operation. Modification of pitch angle 356 is effected by moving adjusting rod 360 as shown at 362. Each blade is pivotally mounted to the hub by a pivot 364 and is connected to the adjusting rod 360 at lever point 366. Although the system shown is a somewhat crude representation of a mechanical adjustment linkage, it will be understood by those skilled in the art that any conventional pitch-adjustment apparatus may be used to effect the pitch adjustment. Rotation of the adjustable side propeller in the clockwise direction 368 will result in thrust in the traveling direction 370.

Figure 14:
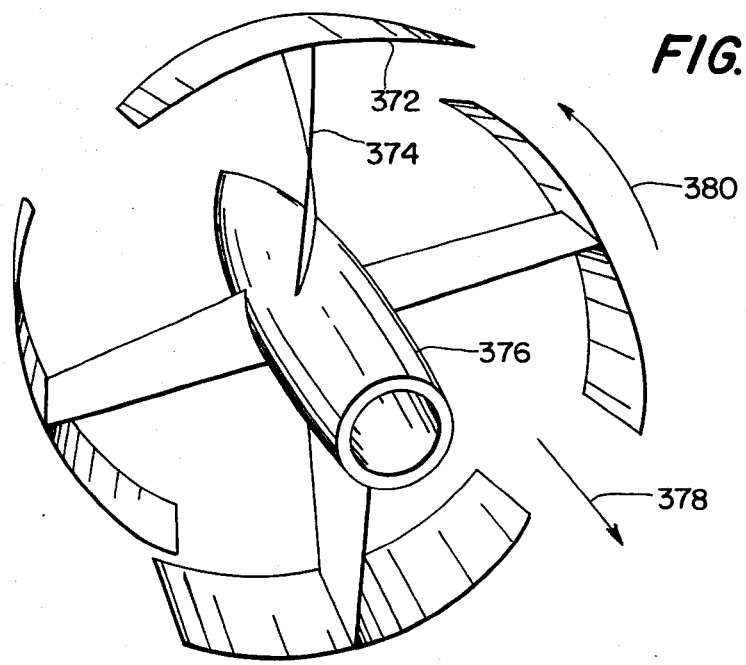
FIG. 14 is a perspective view of the side propeller according to FIGS. 10 and 11.

FIG. 14 is a perspective view of a side propeller similar to that shown in FIGS. 10 and 11, wherein end plates 372 are mounted on end plate support arms 374 of propeller hub 376. The end plate support arms may be shaped to act as conventional screw-type propellers and the end plates 372 are properly pitched as described above with respect to FIGS. 10 and 11 in order to provide thrust in the traveling direction 378 when rotated in the counterclockwise direction 380 as shown.

Figure 15:
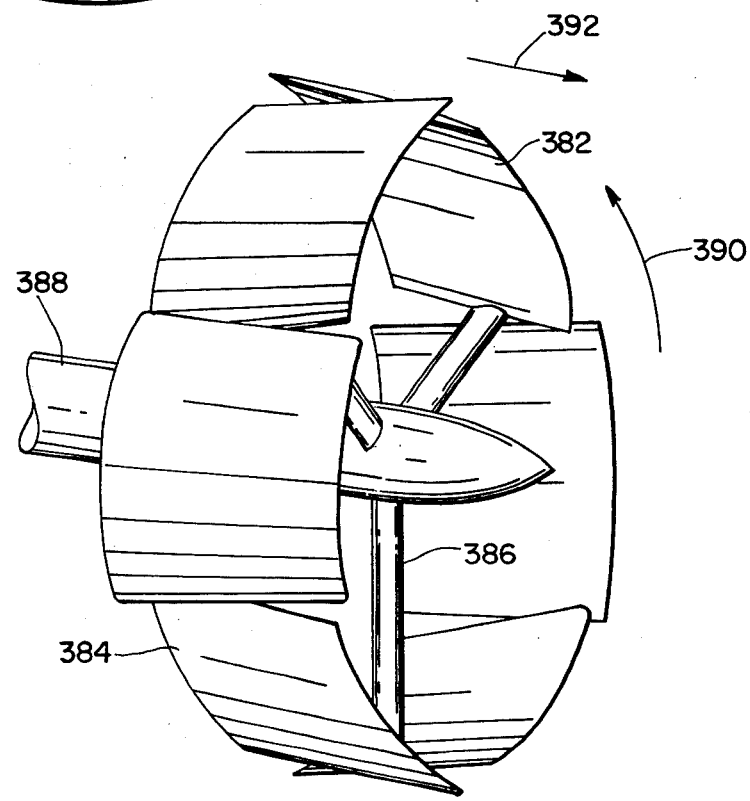
FIG. 15 is a perspective view of a side propeller constructed according to FIGS. 7 and 8.

FIG. 15 shows a perspective view of a side propeller with end plates similar to that of FIGS. 7 and 8, wherein the end plates 382 are extended so as to contact one another and thereby form a substantially closed cylinder 384. End plate support arms 386 may also be shaped to act as a conventional screw propeller and to properly align cylinder 384 coaxially with propeller hub 388. Rotation of the propeller in the counterclockwise direction 390 produces thrust in the traveling direction 392.

With respect to all embodiments of the side propeller invention described above with respect to the present invention it is to be understood that the side propellers may be arranged in such a manner that they are in front of the body to be propelled through the fluid medium, behind such body, or in front of pods which are positioned outboard from the body, such as wing-mounted engine pods on an aircraft. When the side propellers are arranged with the end plates or blades mounted behind the body or behind a wing pod, the end plates or blades can effectively utilize the jet contraction which follows the passage of the body through the fluid medium. When the end plates operate in the confluent flow lines behind the body, the secondary pitch angle of the blades or support arms (that angle measured with respect to the propeller shaft axis) may be correspondingly smaller for efficient deflection in the propulsion direction of the lateral force produced by the end plates or blades.

The side propellers of the present invention compare very favorably with conventional propellers regarding the amount of propulsion lost through the hub. When, for example, the diameter of the propeller is 0.55 meters and that of the hub is 0.15 meter, the area loss in the propeller circle is about 7%.

Further, while in conventional screw-type propellers, the longitudinal axes of the blade shapes are pivoted about the radius of the propeller, the end plates or side blades of the present invention are pivoted at pitch angles about parallels to the propeller shaft which will provide the most efficient operation. The blades or end plates are also set at an angle with respect to the propeller shaft axis in order to deflect the lateral force into the rearward direction to provide forward propulsion. The lateral force is at high traveling speeds so large that the mechanical centrifugal force of the end plates or side blades is more than compensated by the aerodynamic lift force of the end plates or side blades, whereby the end plate supports are subjected to a compressive load rather than a tensile load.

It will be understood by those skilled in the art that the propellers of the present invention may be constructed of any suitable materials conventional to the art. For example, the blades, end plates, end plate supports and hubs may be of brass or aluminum alloys which are cast, welded and finished in a manner presently used for screw-type propellers. The blades and other propeller parts might also be constructed of fiberglass reinforced resinous material or the like.

I claim:

1. A propeller for providng forward thrust to a body travelling at relatively high speed through a surrounding fluid medium, comprising:
    (a) a propeller hub having an axis of rotation;
    (b) a plurality of airfoil surfaces mounted to and distributed radially about said hub; the position of each said airfoil surface being defined by first and second pitch angles, respectively, said first pitch angle being the angle in the rotation direction between the profile longitudinal axis of said airfoil surface and a tangent on the circular arc described by the rotation of said airfoil surface about said propeller shaft, and said second pitch angle being the angle between the profile transversal axis of said airfoil and said axis or rotation, said second pitch angle being less than 90°, whereby the volume described by said rotation propeller is substantially conical in shape and wherein a large volume of said fluid medium is accelerated only slightly by said propeller, thereby resulting in a relatively high level of propeller efficiency; and
    (c) peripherally adjacent airfoil surfaces having oppositely oriented first pitch angles with respect to their tangents and oppositely oriented second pitch angles with respect to the axis of rotation, so that alternate airfoil surfaces will direct fluid radially outward, whereas the remaining airfoil surfaces will direct the fluid radially inward.

* * * * *